United States Patent Office 3,423,686
Patented Jan. 21, 1969

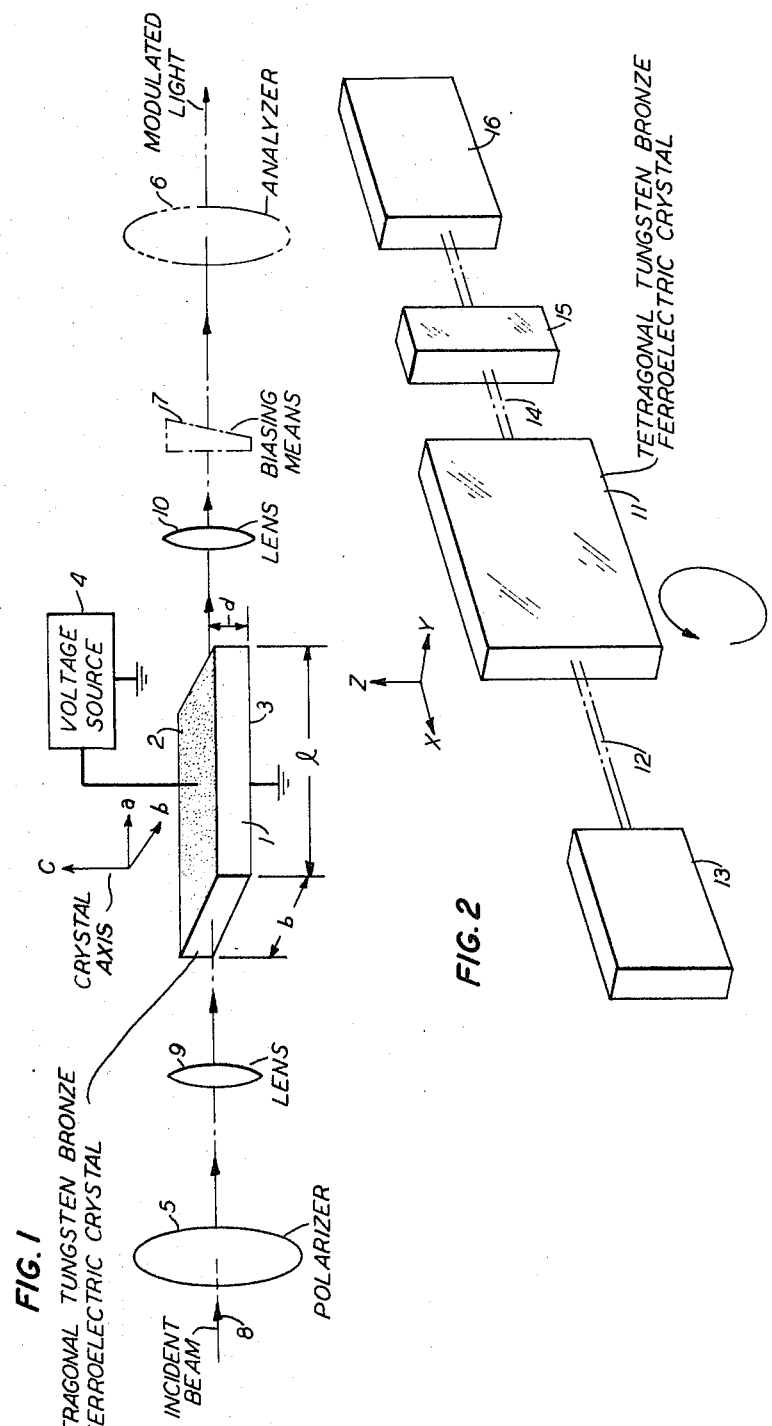

3,423,686
OPTICAL DEVICES UTILIZING SUBSTANTIALLY TETRAGONAL FERROELECTRIC TUNGSTEN-BRONZES
Albert A. Ballman, Woodbridge, and Le Grand G. Van Uitert, Morris Township, Morris County, N.J., assignors to Bell Telephone Laboratories, Incorporated, Murray Hill, Berkeley Heights, N.J., a corporation of New York
Filed July 11, 1967, Ser. No. 652,551
U.S. Cl. 330—4.5                23 Claims
Int. Cl. H03f 7/00

ABSTRACT OF THE DISCLOSURE

A newly investigated class of crystal materials, the ferro electric, substantialy tetragonal, tungsten-bronzes is found to have properties suggesting its use in a variety of optical devices; such devices include electric-optic modulators, second harmonic generators and parametric amplifiers, mixers, etc.

BACKGROUND OF THE INVENTION

Field of the invention

The invention is concerned with the modulation, frequency doubling and other alteration of electromagnetic wave energy at frequencies including those of the visible spectrum. Objectives include the use of such wave energy in communication systems and in switching and memory devices, and to this end the energy is ordinarily coherent. Laser sources of coherent radiation operate over the visible spectrum and into the infrared and for this reason it is such frequencies which are primarily of concern. For these purposes the bandwidth considered to be of interest includes that lying over the wavelength range of from $0.2\mu$ to $6.0\mu$.

Concerned materials are of interest by reason of some alteration of transmission property for wave energy with applied field or by reason of an inherent nonlinearity in transmission property which may give rise to parametric activity. Devices with which the invention is concerned may operate continuously (CW) or pulse.

Description of the prior art

The laser art has developed rapidly since its inception a few years ago. Today there are practical devices operating either CW (continuous wave) or pulse in at least three categories of materials; solid, liquid and gas. Frequencies of operation extend from the middle infrared to the UV. Nevertheless from a related standpoint the laser art is still in its infancy.

In an initial period of exuberance it was recognized that the laser promised a communication system having a bandwidth unapproached by any other system. Other properties suggested more rapid switching apparatus and more compact memory devices. Of course, it was also recognized that various lackings prevented immediate fruition of these promised results. It was recognized that broadband communication systems required rapid modulating and demodulating means, that early conceived switching systems required deflectors and that certain other device applications imposed additional material requirements.

From the material standpoint, early development work centered about KDP (potassium dihydrogen phosphate). This electro-optic material was available in optically perfect single crystal form and it was chemically and physically durable. Its properties permitted relative variation of electromagnetic wave velocity for a given polarization sense with an applied electric field. KDP was the first significant linear electro-optic material and, largely due to its ready accessibility, it continues to be regarded as an important optical modulator material. Despite its excellent physical and chemical properties, however, KDP shows a shortcoming in that large values of applied voltage and power are required to result in practical degrees of modulation. Where $\epsilon$ is dielectric constant and $v_\pi$ is the value of applied field required to produce a relative phase change of one-half wave length in a cube of material, the power required for modulation may be expressed as proportional to the product of $\epsilon v_\pi^2$. The value of $v_\pi$ for KDP is of the order of 8,000 volts and the value of $\epsilon v_\pi^2$ is about $240 \times 10^7$.

Recently, interest has centered about a new linear electric-optic material, lithium tantalate, which, while showing most of the excellent properties of KDP has $v_\pi$ value of the order of 2,800 volts and an $\epsilon v_\pi^2$ product of about $32 \times 10^7$. While at an early stage in its development lithium tantalate developed troublesome local inhomogeneities in dielectric constant upon transmission of fractional watt laser powers, this problem has now been largely overcome and experimental devices have been successfully operated over long periods of time. Despite the acknowledged improvement resulting from introduction of this material, however, the desire still exists for materials which will permit modulation at still lower levels of applied field or which will permit use of smaller modulating elements.

For second harmonic generators (SHG) and parametric applications, selection of materials has been still more restricted. Essentially all materials which manifest activity from the electric-optic standpoint also show sufficient non-linearity to permit such uses. However, the very non-linearity which gives rise to the useful phenomena is generally self-defeating. While such materials do indeed result in generation of wave energy of frequencies different from those introduced, frequency dependent velocity variations result in a periodicity of reinforcement and subtraction of such energy. Accordingly, early devices were effective only over a distance within which the differing wave frequencies could be kept substantially in phase.

A significant development was described by J. A. Giordmaine in 8 Phys. Rev. Let. p. 19. The Giordmaine approach was to utilize a nonlinear medium which evidenced a degree of birefringence at least as great as the frequency dispersion of the medium. The approach was to utilize a crystalline direction such that the velocity of the ordinary ray of one frequency was the same as the extraordinary ray of another. This "phase matching" approach has now become standard in the art, and it was carried to a high degree of perfection in U.S. Patent 3,262,058 where the principle was specifically applied to lithium niobate. Optimum devices set forth in this patent additionally made use of appropriate choice of temperature and crystal direction which permitted phase matching normal to the optic axis of this uniaxial material.

For some time now lithium niobate has been the acknowledged standard nonlinear material for use in SHG and parametric devices. A drawback to the material, however, developed as high power CW laser sources became available. At such time it was found as in lithium tantalate that substantial periods of operation resulted in radiation damage again taking the form of local refractive index inhomogeneities.

While there presently appears to be some promise that this problem too will be solved, long term practical device operation using this material is not now a reality.

It is clear that a need exists for new nonlinear materials affording greater efficiency of optical frequency conversion and/or radiation damage resistance.

Summary of the invention

A class of single crystalline materials which may be defined as belonging to the ferroelectric, substantially tetragonal, tungsten-bronzes is found to have optical properties of interest for use in the electro-optic devices and also in nonlinear optic devices. While these materials are ordinarily considered difficult to grow and while special pains are required to produce crystals of appropriate optical properties, these lengths are justified by useful device properties which appear to be in some way enhanced by crystal structure. Exemplary members manifest $v_\pi$ and $\epsilon v_\pi^2$ values substantially lower than that of lithium tantalate. Some material within the included class evidence a nonlinearity as great as or greater than that of lithium niobate while permitting phase matching over a broad frequency range. Certain included materials show substantially complete resistance to radiation damage under ordinary operating conditions. There is sufficient variety within the inventive class to permit selection of Curie temperature values over a range of up to 850° C., thereby, on the one hand, permitting large temperature varition of dielectric constant and, on the other, substantial independence of such parameters.

While most workers in the field are familiar with the tetragonal tungsten-bronze structure, it is desirable to redefine the class within the present context. Crystallographically materials of the approximate structure indicated by the present invention are of the space and point grouping $P4bm(C_{4v}^2)$. It has been indicated that materials of concern are substantially tetragonal. Within this structure the two axes, $a$ and $b$, are equal or nearly so and are approximately three times the length of the third axis, $c$. A typical cell may thereby be regarded as an array of nine perovskite-like cells 3 x 3 x 1. To allow for crystallographic distortions from tetragonal resulting from certain substitutions as well as certain growth conditions, the $a$ over $b$ ratio is defined as extending from 0.96 to 1.04. The tetragonal tungsten-bronze structures are often referred to as "defect structures" taking this designation from the fact that certain site locations can be partially unfilled.

A further requirement of materials of the invention is that they manifest a ferroelectric Curie point $T_c$ at a real temperature. It is well known that at least one prior art ferroelectric material, lithium niobate, does not manifest a traditional ferroelectric hysteresis loop upon field reversal. However, since the hysteresis loop is, per se, no advantage in the operation of these devices, it is not a requirement that materials of the invention show a hysteresis loop.

Brief description of the drawing

FIG. 1 is a schematic view of a modulator using a material of the invention; and FIG. 2 is a schematic view of a nonlinear device using a material of the invention.

Detailed description

*Including class.*—Suitable materials are included within that class set forth under "Summary of the Invention." Any such material, provided of course that it is possessed of such other properties as are necessary for device operation is, suitable. Such other properties include requisite transparencies for the concerned frequencies as well as sufficient physical and chemical stability under desired operating conditions. Little difficulty should be encountered in meeting such desiderata. The materials investigated vary from water white to yellow brown in color and most compositions are sufficiently transparent over the wavelength range of .2 to 6 microns to be useful. Also it is the nature of the included materials that they are characteristically insoluble in water as well as in the commonly encountered acids and bases. The described tungsten-bronze structure is generally the stable form over a broad temperature range including room temperature.

While it is believed that the inventive materials are properly categorized by the above descriptive matter, it is convenient to outline at least the primary materials in chemical terms. From this standpoint and also with a view to characteristic device properties four categories may be set forth. They are:

(1) $M^{II}_{.2-1}M^{I}_{0-.3}M^{III}_{0-.3}M'^{V}_{2-2.3}O_6$,
(2) $M^{II}_{.2-.8}M^{I}_{.4-.7}M^{III}_{0-.3}M'^{V}_{2}O_6$,
(3) $M^{I}_{.9-1.2}M^{III}_{0-.3}M''^{I}_{.2-.8}M'^{V}_{2}O_6$,
(4) $M^{II}_{.9-1.2}M^{III}_{0-.3}M'^{IV}_{0-.7}M'^{V}_{1.6}O_6$, in which each of the M ions is any one or combination of the chemical elements as set forth:

$M^I$=K, Na, and up to 20 atom percent total of any one or combination of Li, Rb and Cs (that is, a maximum of ⅕ of the $M^I$ ions are Li, Rb and/or Cs). These ions, as well as $M^{II}$ and $M^{III}$, occupy the large tunnel-like sites sometimes designated "A-sites" in the tungsten-bronze structure.

$M^{II}$=Ba, Sr, Ca, Pb, Sn.

$M^{III}$=Y, Sc, and any of the rare earths from Nos. 57 through 71 on the periodic chart according to Mendelyeev.

$M'^{IV}$=Ti, Zr, Sn and up to 10 atom total percent of any one or combination of Hf, Ge, Si. These ions, as well as the $M'^V$ ions occupy the centers of the perovskite-like unite sometimes designated "B-sites."

$M'^V$=Nb or Ta together with V. V is limited to a maximum amount of 30 atom percent of the total number of $M'^V$ ions.

$M''^I$=Li together with up to 20 atom percent Na. These ions occupy the small triangular sites sometimes designated the "C-sites" in the tungsten-bronze structure.

The categories and amounts of acceptable M ions are based on exhaustive experimental work and diverse considerations. The limitations derive as follows:

$M^I$—greater than 20 atom percent of lithium, rubidium or cesium results in deviations from the tungsten-bronze structures defined.

$M^{III}$—greater than 30 atom percent of trivalent ions causes deviations from the defined tetragonal tungsten-bronze structure.

$M^{IV}$—greater than 10 atom percent of hafnium, germanium or silicon results in multiphase material.

$M^V$—greater than 80 atom percent of tantalum and vanadium results in depression of the Curie point to cryogenic temperautres or below, and greater than 30 atom percent of vanadium also results in multiphase material.

$M'^{IV}$ and $M'^V$—Exceeding either expressed limit may result in objectionable second phase material of differing structure.

$M''^I$—greater than 20 atom percent of sodium results in deviations from the tungsten-bronze structure defined.

The definition set forth is presented with a view to assisting the worker expert in the art in the selection of suitable materials for the inventive uses and not with a view to defining the broadest possible categories of materials. It is possible to deviate from the composition set forth at least to a minor extent both with respect to amount and kind of recited elements although it is be- Mixtures (3)–(4):

| | $T_c$ °C |
|---|---|
| $Ba_{.6}Na_{.6}Li_{.4}Zr_{.2}Nb_{1.8}O_6$ | ~500 |
| $Ba_{.4}Sr_{.2}Na_{.6}Li_{.4}Sn_{.05}Zr_{.15}Nb_{1.8}O_6$ | ~450 |
| $Pb_{.2}Ba_{.2}Sr_{.1}Ca_{.1}Na_{.3}K_{.3}Li_{.4}Sn_{.1}Ti_{.1}Ta_{.8}NbO_6$ | ~250 |

*Included compositions.*—While it is believed the greatest insight into the included scope is afforded by reference to the four categories and combinations as set forth above, for other purposes it is convenient to re-express the included compositions in terms of a single formula. Such a formula is set forth below:

$$M^I_{0-1.2}M''^I_{0-1}M^{II}_{0-1.2}M^{III}_{0-.4}M'^{IV}_{0-.4}M'^V_{1.6-2}O_6$$

where the M ions are as defined above.

*Preparation.*—It has been indicated that the so-called non-stoichiometric materials included within the tetragonal tungsten-bronze class are prepared in single crystalline form only with difficulty. As is to be expected, the defect nature of these compositions suggest the need for closer control of parameters and often slower growth rates. Actual preparatory techniques for both the non-stoichiometric and the stoichiometric materials are themselves traditional. They include seeded crystal growth as by the Czochralski method, melt growth and also flame fusion.

In general, Czochralski growth is carried out by first mixing the starting ingredients, which may be in the form of carbonates or other compounds which yield oxides under reaction conditions, by prereacting at temperatures of the order of 1000° C. or higher, by grinding and finally by melting in a crucible and withdrawing a contacting seed crystal at such rate as to withdraw freezing material. Starting ingredients may or may not deviate from the stoichiometric indicated amounts. Melt growth is ordinarily carried out simply by producing a melt and by cooling from a temperature of the order of 1250° C. Starting ingredients again may be oxides or other compounds which will yield oxides. In the flame fusion technique starting materials are mixed, prereacted and milled as in the Czochralski technique, and this material is used as feed which is introduced in a flame in the usual manner. Specific examples follow. Certain optical properties are noted.

*Example 1.*—$Ba_{.5}Sr_{.5}Nb_2O_6$ is prepared using the Czochralski technique by placing .5 mol or 98.7 grams of $BaCO_3$, .5 mol or 73.8 grams of $SrCO_3$ and 1 mol or 265.82 grams of $Nb_2O_5$, all in particulate form, in a crucible which is raised to a temperature of 1000° C. This temperature is maintained for a period of about four hours which is generally sufficient to eliminate $CO_2$ and $H_2O$ present. This prereacted material is then ground by hand or ball mill, and the resulting powder is placed in a crucible in which it is melted by raising to a temperature of about 1550° C. A seed crystal preferably of the desired composition is next partially immersed in the melt, and after permitting crystal and melt to come to thermal equilibrium is slowly withdrawn at a rate of about ¼″/hr. Material of the designated composition prepared by this technique has been approximately ten times as effective as KDP as a SHG. $v_\pi$ and $\epsilon$ values of about 300 volts and 400 respectively have been measured.

*Example 2.*—$Pb_{.4}Ba_{.3}Sr_{.3}Nb_2O_6$ was prepared by Czochralski growth by following the procedure of Example 1, however substituting the following starting ingredients in amounts indicated.

| Ingredient | Mols. | Gms. |
|---|---|---|
| PbO | .4 | 89.28 |
| $BaCO_3$ | .3 | 59.22 |
| $SrCO_3$ | .3 | 44.29 |
| $Nb_2O_5$ | 1 | 265.82 |

SHG efficiency was measured at about ten times that of KDP with $v_\pi$ and $\epsilon$ values of about 200 volts and 800 respectively.

*Example 3.*—$Ba_{.8}Na_{.4}Nb_2O_6$ was prepared by the method of Example 1 however substituting as starting materials:

| Ingredient | Mols. | Gms. |
|---|---|---|
| $BaCO_3$ | .8 | 157.92 |
| $Na_2CO_3$ | .2 | 21.2 |
| $Nb_2O_5$ | 1 | 265.82 |

Measured properties were SHG=900 times as effective as KDP, $v_\pi$=1100 volts, $\epsilon$=50.

*Example 4.*—$K_{1.2}Li_{.8}Nb_2O_6$ was prepared by the method of Example 1 however substituting as starting materials:

| Ingredient | Mols. | Gms. |
|---|---|---|
| $K_2CO_3$ | .66 | 91.2 |
| $Li_2CO_3$ | .44 | 32.6 |
| $Nb_2O_5$ | .90 | 239.2 |

Measured properties were: SHG=100 times as effective as KDP, $v_\pi$=930 volts, $\epsilon$=100. Note that the composition of this example pulled somewhat off stoichiometry.

*Example 5.*—The composition was prepared by spontaneous nucleation from the melt. The starting ingredients were first placed in a crucible, the temperature was raised to above 1250° C. until total solution was achieved and crucible and contents were finally cooled from 1250° C. at a rate of about 1° C. per hour down to 900° C. This composition is considered to be of primary interest for nonlinear applications. Final composition:

$$K_{1.2}Li_{.8}Ta_{1.4}Nb_{.6}O_6$$

| Ingredient | Mols. | Gms. |
|---|---|---|
| $K_2CO_3$ | .38 | 52.5 |
| $Li_2CO_3$ | .25 | 18.4 |
| $Ta_2O_5$ | .11 | 48.6 |
| $Nb_2O_5$ | .26 | 69 |

SHG efficiency was about 100 times that of KDP.

*Example 6.*—$Na_{1.2}Li_{.8}Nb_2O_6$ was prepared by melt growth in accordance with the procedure of Example 5.

| Ingredient | Mols. | Gms. |
|---|---|---|
| $Na_2CO_3$ | .2 | 21.2 |
| $Li_2CO_3$ | .2 | 14.8 |
| $Nb_2O_5$ | .6 | 159 |

This composition also had an SHG coefficient about 100 times that of KDP.

*Example 7.*—Flame fusion was used to grow $$Ba_{1.2}Ti_{.4}Nb_{1.6}O_6$$

| Ingredient | Mols. | Gms. |
|---|---|---|
| $BaCO_3$ | 1.2 | 236 |
| $TiO_2$ | .4 | 31.9 |
| $Nb_2$ | .8 | 212 |

SHG coefficient was about 300 times that of KDP.

PREFERRED COMPOSITIONS

It is possible to specify certain preferred compositions for particular device uses:

*Composition 1*

$$Ba_{.25+x}Sr_{.75-x}Nb_2O_6$$

$$X=0-0.5$$

Materials in this compositional range have relatively low values of $\epsilon v_\pi^2$ and accordingly are considered particularly useful in modulators and other electro-optic devices.

lieved that the essential ingredients of all preferred compositions are incorporated.

Experimental work has resulted in certain generalizations with respect to the four categories. While all four categories of materials may be utilized either in electro-optic or nonlinear applications, lowest values of $v_\pi$ and $\epsilon v_\pi^2$ have been found in materials within category 1. Materials within categories 2 and 3 are noted for their nonlinearity largely because it is within such materials that suitable values of birefringence have been found. In other words, while sufficient nonlinearity identifies with $v_\pi$, preferred values of birefringence permitting adequate phase matching are more likely to be found within compositions in categories 2 and 3. Compositions of category 4 are noted for their gradual transitions; that is, their Curie temperatures are not as well defined as those of the compositions of the other categories. The presence of some ferroelectricity above $T_c$ and of a more gradual change in $\epsilon$ below $T_c$ reduces the temperature dependence of the electro-optic coefficient.

It has been observed that improved radiation damage resistance can be imparted by filling the A-sites in the structure beyond the ratio of one A to two B as is possible in the category 2, 3 or 4 materials or by use of lead or tin in any of the materials. Generally, it has been observed that the highest nonlinear coefficients occur in sodium-containing materials having filled A-sites and a preference therefor exists for such compositions in this use. It is interesting to note in this connection that the excellent nonlinearity of the prior art material, lithium niobate, is retained in the category 3 material in which $M''^I$ is lithium and in which $M^I$ is potassium. While it will be of considerable interest to workers in the field that phase matching comparable to that obtained in lithium niobate is thus afforded in a new radiation damage resistance material, it is more significant that the sodium-containing category 2 material is perhaps an order of magnitude more efficient.

As is seen from the examples contained herein permissible materials include combinations of any 2 or more of the 4 categories, and it is largely with a view to simplification that materials are set forth in terms of such groupings. In general, it has been found that properties characteristic of any of the end members designated as compositions 1 through 4 are largely retained if the combined composition contains at least 80 mol percent of the given end member.

Before proceeding to the specific examples, certain general comments are appropriate. It has been uniformly observed that despite the chemical diversities of the included members effectiveness both for electric-optic applications and for nonlinear applications are generally equal or superior to corresponding characteristics of the best linear materials reported. For example, lithium niobate and lithium tantalate have $\epsilon v_\pi^2$ products of $36 \times 10^7$ and $32 \times 10^7$ respectively with $\epsilon$ measured at 100 kilohertz. The same product measured at the same frequency for several of the compositions herein show values of from $10 \times 10^7$ to $3.2 \times 10^7$. It has already been noted that nonlinear coefficients for phase matchable materials included within the compositional range of the invention are often equal to or better than those associated with the best previously available nonlinear material, lithium niobate. It is evident from the studies that have been made that these excellent device properties are, to an appreciable extent, due to the designated tungsten-bronze structure rather than to the precise chemical matter or stoichiometry involved.

Naturally there has been some effort to correlate the excellent properties with structure. While no reliance is had on the theory which follows, it is offered for whatever assistance it may be to the person interested in the mechanistic origins of the described phenomena.

As indicated earlier, the unit cell dimensions of the tetragonal tungsten-bronzes are about three times that of the basic perovskite-like anionic group ($WO_3$, $NbO_3$, etc.) and a total of nine perovskite-like groups are contained per unit cell. See 32 Journal of Chemical Physics 1846 (June 1960). These groups are arrayed in a puckered fashion that allows for the accommodation of large five-sided tunnels, A-sites, and small triangular sites, C-sites, as well. The ions occupying the A-sites may be more easily displaced from one extreme position to another by an imposed electric field. Further, the puckered arrangement allows for greater freedom of direction of distortion than would be expected for more conventional ferroelectrics allowing for enhanced nonlinear coefficients. These peculiarities are conducive to low drive voltages ($v_\pi$) for modulation and strong SHG.

Typical included materials are set forth. Categories of exemplary materials are designated by M members or by mixtures of M members as noted.

| | $T_c$ ° C. |
|---|---|
| Category 1: | |
| $Ba_{.5}Sr_{.5}Nb_2O_6$ | 120 |
| $Pb_{.4}Ba_{.3}Sr_{.3}Nb_2O_6$ | 142 |
| $Pb_{.2}Ba_{.3}Sr_{.3}Na_{.1}Nd_{.1}Nb_2O_6$ | 200 |
| $Pb_{.4}Ba_{.6}Nb_2O_6$ | 350 |
| $Pb_{.4}Ba_{.3}Ca_{.3}Nb_2O_6$ | 140 |
| $Pb_{.5}Sr_{.5}Nb_2O_6$ | 100 |
| $BaNb_4O_{11}$ | 400 |
| $PbNb_6O_{16}$ | 640 |
| Category 2: | |
| $Ba_{.8}Na_{.4}Nb_2O_6$ | 550 |
| $Ba_{.6}Na_{.5}Gd_{.06}Nd_{.04}Nb_2O_6$ | 550 |
| $Pb_{.2}Ba_{.6}K_{.4}Nb_2O_6$ | 350 |
| $Pb_{.8}Na_{.4}Nb_2O_6$ | 520 |
| $Ba_{.8}Na_{.2}K_{.2}Nb_2O_6$ | 400 |
| $Ba_{.8}Na_{.3}Li_{.1}Nb_2O_6$ | 550 |
| Category 3: | |
| $K_{1.2}Li_{.8}Nb_2O_6$ | 420 |
| $K_{1.15}Nd_{.05}Li_{.7}Nb_2O_6$ | 400 |
| $K_{1.2}Li_{.8}Ta_{1.4}Nb_{.6}O_6$ | 30 |
| $Na_{1.2}Li_{.8}Nb_2O_6$ | 800 |
| $Na_{.6}K_{.6}Li_{.8}Nb_2O_6$ | 350 |
| $K_{1.1}Rb_{.1}Li_{.8}Nb_2O_6$ | ~400 |
| $KNa_{.3}Li_{.7}Nb_2O_6$ | ~650 |
| Category 4: | |
| $Ba_{1.2}Ti_{.4}Nb_{1.6}O_6$ | ~400 |
| $Ba_{1.15}Nd_{.05}Ti_{.45}Nb_{1.55}O_6$ | ~400 |
| $Ba_{1.2}Zr_{.4}Nb_{1.6}O_6$ | ~300 |
| $Ba_{1.2}Sn_{.4}Nb_{1.6}O_6$ | ~275 |
| $Pb_{.2}Ba_1Ti_{.4}Nb_{1.6}O_6$ | ~400 |
| $Pb_{.4}Ba_{.8}Zr_{.4}Nb_{1.6}O_6$ | ~425 |
| $Pb_{.6}Ba_{.6}Sr_{.4}Nb_{1.6}O_6$ | ~300 |
| Mixtures (1)–(2): | |
| $Ba_{.9}Na_{.2}Nb_2O_6$ | ~450 |
| $Ba_{.7}Gd_{.05}Nd_{.05}Na_{.3}Nb_2O_6$ | ~450 |
| $Pb_{.3}Ba_{.55}Na_{.3}Nb_2O_6$ | ~400 |
| $Ba_{.6}Pb_{.3}K_{.2}Nb_2O_6$ | ~400 |
| $Ba_{.4}Pb_{.55}Li_{.1}Nb_2O_6$ | ~340 |
| Mixtures (1)–(3): | |
| $Ba_{.75}Na_{.2}Li_{.3}Ta_{.5}Nb_{1.5}O_6$ | ~400 |
| $Pb_{.5}K_{.6}Li_{.4}Nb_2O_6$ | ~300 |
| $Pb_{.4}Y_{.05}Tm_{.05}K_{.6}Li_{.3}Nb_2O_6$ | ~300 |
| $Pb_{.2}Ba_{.3}Sr_{.3}Na_{.2}Li_{.2}Nb_2O_6$ | ~350 |
| $Ba_{.65}Ca_{.1}Na_{.25}Li_{.25}Nb_2O_6$ | ~375 |
| Mixtures (1)–(4): | |
| $Ba_{1.1}Ti_{.2}Nb_{1.8}O_6$ | ~400 |
| $Ba_1La_{.05}Nd_{.05}Ti_{.3}Nb_{1.7}O_6$ | ~350 |
| $Pb_{.2}Ba_{.9}Sn_{.2}Ta_{.4}Nb_{1.4}O_6$ | ~300 |
| $Pb_{.3}Ba_{.5}Sr_{.2}Ca_{.1}Sn_{.1}Zr_{.1}Nb_{1.8}O_6$ | ~250 |
| Mixtures (2)–(3): | |
| $Ba_{.6}Na_{.6}Li_{.2}Nb_2O_6$ | 540 |
| $Ba_{.5}Gd_{.05}Nd_{.05}Na_{.6}Li_{.1}Nb_2O_6$ | ~520 |
| $Pb_{.2}Ba_{.3}Sr_{.2}Na_{.5}LiNb_2O_6$ | ~500 |
| $Pb_{.3}Ba_{.2}Sr_{.1}Ca_{.1}Na_{.5}LiNb_2O_6$ | ~500 |
| Mixtures (2)–(4): | |
| $BaNa_{.2}Ti_{.2}Nb_{1.8}O_6$ | ~500 |
| $Pb_{.2}Ba_{.6}Sr_{.2}K_{.2}Sn_{.1}Zr_{.1}Nb_{1.8}O_6$ | ~400 | for the harmonic in SHG. For the three-frequency case, it is desirable to support both generated frequencies. In most instances, this cannot be accomplished by coating the face of the crystal, and it is necessary to provide at least one spaced adjustable mirror which may be positioned at such distance from the face of the crystal 11 as to support the frequencies of concern. Simultaneous support of the pump frequency may similarly be accomplished. However, the complication so introduced is justified only when the pump level requires it.

The crystalline orientation shown as the initial position for crystal 11 in the apparatus of FIG. 2 eliminates the effect of double refraction, as has been discussed. This angle may be retained for a broad range of conditions when operating either in the degenerate or nondegenerate mode simply by controlling temperature.

The invention has been described in terms of a limited number of embodiments. More generally, however, it is considered to derive from the discovery that the substantially tetragonal tungsten-bronze crystallographic structure as otherwise described shows optical properties of considerable device interest. While there is variation in properties from composition to composition within the prescribed range, it is found that device properties are enhanced by reason of the defined tetragonal tungsten-bronze structure. While it is true that somewhat more care must be taken in growing such materials having the requisite device properties, it is believed that such extra precautions are justified. Naturally, specific choice of composition will depend to a large extent on the particular device properties that are required and also on a wide range of additional considerations such as ease of growth, availability of starting of materials, bandwidth of requisite transparency, etc. The invention, however, is broadly grounded on the enhancement of properties as traced to the designated structure. The accompanying claims are to be so construed.

What is claimed is:

1. Device comprising a crystalline body consisting essentially of a ferro-electric single crystal, said crystal being transparent to electromagnetic wave energy at some wavelength within the wavelength of from $.2\mu$ to $6\mu$ together with first means for introducing a beam of coherent electromagnetic radiation into said body and second means for extracting a beam of coherent electromagnetic radiation from said body characterized in that said body has the approximate structure of a tetragonal tungsten-bronze with the space group and point group designations P4bm($C^2_{4v}$), said structure being defined by three rectilinear axes the length of two of which are related by the ratio of from 0.96 to 1.04 and the third of which is approximately one-third as great as either of the first two.

2. Device of claim 1 in which at least one of said means comprises an optically polished surface.

3. Device of claim 1 in which the beam provided for in the said first means is plane polarized.

4. Device of claim 3 in which the beam provided for in the said second means includes a component of a frequency different from the beam provided for in the said first means.

5. Device of claim 4 in which the birefringence of the said body is at least as great as the dispersion in velocity of the two said frequencies within the said body and in which the said body is positioned so that the angle defined by the said incoming beam and the optic axis is such that an ordinary wave of one of the said frequencies within the said body is phase matched to an extraordinary wave of another of the said frequencies within the body.

6. Device of claim 5 together with resonant means for supporting a standing wave of at least one of the said frequencies in the said body.

7. Device of claim 5 in which the angle defined by the incoming beam and the optic axis of the said body is 90 degrees.

8. Device of claim 5 in which there are coherent electromagnetic waves of three frequencies within the said body and the frequency relationship is such that the greatest is equal to the sum of the other two.

9. Device of claim 3 together with a third means for impressing an electric field across said body in such direction as to effect a transmission property for the said beam.

10. Device of claim 9 in which the said third means is substantially along the crystallographic $c$ axis of the said body and in which the said first means provides for an incoming beam which is substantially normal to the crystallographic $c$ axis of the said body.

11. Device of claim 10 in which the plane of polarization of the beam is at an angle intermediate that corresponding with the crystallographic $c$ axis and an angle of 90 degrees to the $c$ axis.

12. Device of claim 1 in which the said body consists essentially of a composition selected from the group consisting of:

(1) 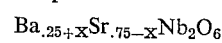$M^{II}_{.2-1}M^{I}_{0-.3}M^{III}_{0-.3}M'^{V}_{2-2.3}O_6$,
(2) $M^{II}_{.2-.8}M^{I}_{.4-.7}M^{III}_{0-.3}M'^{V}_2O_6$,
(3) $M^{I}_{.9-1.2}M^{III}_{0-.3}M''^{I}_{.2-.8}M'^{V}_2O_6$,
(4) $M^{II}_{.9-1.2}M^{III}_{0-.3}M'^{IV}_{0-.7}M'^{V}_{1.6}O_6$, in which the designated ions are selected from the groups consisting of:

$M^{I}$ = K, Na, and up to 20 atom percent total of any one or combination of Li, Rb and Cs;
$M^{II}$ = Ba, Sr, Ca, Pb, Sn;
$M^{III}$ = Y, Sc, and any of the rare earths from Nos. 57 through 71 on the periodic chart according to Mendelyeev;
$M'^{IV}$ = Ti, Zr, Sn and up to 10 atom total percent of any one or combination of Hf, Ge, Si;
$M'^{V}$ = Nb or Ta together with V but V is limited to a maximum amount of 30 atom percent of the total number of $M'^{V}$ ions;
$M''^{I}$ = Li together with up to 20 atom percent Na.

13. Device of claim 12 in which the said body consists essentially of the composition

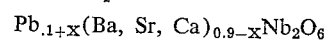$Ba_{.25+x}Sr_{.75-x}Nb_2O_6$ where X equals from 0 to 0.5.

14. Device of claim 12 in which the said body consists essentially of the composition $Pb_{.1+x}(Ba, Sr, Ca)_{0.9-x}Nb_2O_6$ where X equals from 0 to 0.4.

15. Device of claim 12 in which the said body consists essentially of the composition $(Pb, Ba, Sr, Ca)_{.8-x}Na_{.4+2x}Nb_2O_6$ where X equals from 0 to .2.

16. Device of claim 12 in which the said body consists essentially of the composition

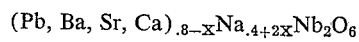$Ba_{1.2-x}(Ti, Sn, Zr)_{0.4-2x}Nb_{1.6+2x}O_6$ where X equals from 0 to .2.

17. Device of claim 12 in which the said body consists essentially of the composition

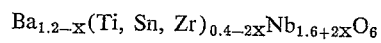$Ba_{.8-2x}Na_{.4+x}M^{III}_xNb_2O_6$ where X equals from 0 to .2.

18. Device of claim 12 in which the said body consists essentially of the composition

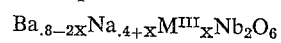$K_{1.2-x}Li_{.8+x}Nb_2O_6$

where X equals from 0 to .2.

19. Device of claim 12 in which the said body consists essentially of the composition

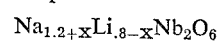$Na_{1.2+x}Li_{.8-x}Nb_2O_6$ where X equals from 0 to .2.

Composition 2

$$Pb_{.1+x}(Ba, Sr, Ca)_{0.9-x}Nb_2O_6$$

$$X = 0\text{-}0.4$$

Materials in this compositional range have relatively low values of $\epsilon\nu_\pi^2$ and accordingly are also considered particularly useful in electro-optic devices.

Composition 3

$$(Pb, Ba, Sr, Ca)_{.8+x}Na_{.4-2x}Nb_2O_6$$

$$X = 0\text{-}.2$$

Materials in this range are desirable for use in nonlinear applications due to their effective SHG coefficient and their relatively high values of birefringence so permitting phase matching over a wide range of frequencies. $\epsilon\nu_\pi^2$ products are generally not as low as those of the compositional ranges for 1 and 2 above, however, Curie temperatures may be much higher and the drive powers for modulation compare quite favorably with many prior art materials. Use in electro-optic devices is not precluded. A more preferred composition range may be expressed as $$Ba_{.8+x}Na_{.4-2x}Nb_2O_6$$

$$X = 0\text{-}.15$$

Included compositions within this preferred range and $Ba_{.8}Na_{.4}Nb_2O_6$ in particular represent the most effective nonlinear phase matchable materials thus far observed. Some scattering is observed in $Ba_{.8}Na_{.4}Nb_2O_6$ due to twinning. This source of scattering can be removed by stressing the crystal along a 110 axis while heating to about 400° C. and cooling to below 200° C. Long term exposure to intense laser beams have resulted in no measurable radiation damage.

Composition 4

$$Ba_{1.2-x}(TiSnZr)_{0.4-2x}Nb_{1.6+2x}O_6$$

$$X = 0\text{-}.2$$

Materials in this range are desirable for use in nonlinear applications due to their effective SHG coefficient and for relatively high values of birefringence so permitting phase matching over a wide range of frequencies and enhanced temperature stabilities. A number of these compositions are stable tetragonal at room temperature, not requiring stress treatments.

Composition 5

$$K_{1.2-x}Li_{.8+x}Nb_2O_6$$

$$X = 0\text{-}.2$$

Materials in this range, and in particular about $X=0$, are desirable for use in nonlinear applications due to their effective SHG coefficients which are as large as those for $LiNbO_3$ and their high values of birefringence ($\sim 0.19$) at $.63\mu$.

Composition 6

$$Na_{1.2+x}Li_{.8-x}Nb_2O_6$$

$$X = 0\text{-}.2$$

Materials in this range are also desirable for nonlinear applications particularly those requiring high Curie temperature applications. $T_c$ is about 800° C. for the composition $X=0$.

Composition 7

$$Ba_{.4+x}Na_{.8-x}Li_{.4-x}Nb_2O_6$$

$$X = 0\text{-}.4$$

These compositions represent mixtures of compositions 2 and 3. They have the advantage of a stable tetragonal region at room temperature so that the "as grown" crystals only require poling and not stressing to eliminate light scatter. They are outstanding SHG materials.

Composition 8

$$Ba_{.6+x}Na_{.6-x}(TiSn)_{.2-x}Nb_2O_6$$

$$X = 0\text{-}.2$$

These compositions represent mixtures of compositions 2 and 4. A number of these materials have outstanding SHG properties and are tetragonal at room temperature.

Composition 9

$$Ba_{.8-2x}Na_{.4+x}M^{III}{}_xNb_2O_6$$

$$X = 0\text{-}.2$$

These compositions are modifications of $$Ba_{.8}Na_{.4}Nb_2O_3$$

that include ions that may fluoresce under suitable excitation. The excellent optical quality of the host makes this system desirable as a tunable coherent light source for ions such as Nd, Ho, Er, Tm, etc.

*The drawing.*—Referring again to FIG. 1 the device depicted is but one form of electric-optic modulator. It comprises electro-optic modulator 1 composed of a single crystal of a material having a tungsten-bronze structure in accordance with the invention. In one preferred use a crystal may be cut with the orientation as shown (a short dimension across which field is applied corresponding with the c axis). Ilustrative dimensions are 0.10" in height and thickness and 0.4" in length. Electrodes are affixed to surfaces 2 and 3 against which an electric field source for modulating the carrier is introduced for modulating the carrier as from voltage source 4. Body 1 is placed between a pair of crossed polarizers, 5 and 6, having their polarization directions oriented at +34° and −45° with respect to the c axis of body 1. A biasing source 7 which may, for example, be a quartz wedge is used to adjust to extinction or to the required relative transmission intensity depending upon the desired mode of operation. A beam 8 of electro-magnetic wave energy as from a helium-neon laser is propagated as shown. Lens 9 serves to focus the beam within body 1 and lens 10 is used to focus the exiting beam.

Of course the specific description of FIG. 1 is to be considered but illustrative. It is conventional to operate electro-optic devices in such manner as to modulate frequency or phase rather than amplitude and also to use a retraversing transmission path. Frequency and phase modulation are most expeditiously achieved by causing the plane of polarization of the incident beam 8 to coincide with a major axis which in turn is either orthogonal to or parallel to the applied field direction.

In FIG. 2 there is depicted a single crystal body 11 of a tungsten-bronze structure. The crystallographic orientation of the body is indicated on the figure. A coherent electromagnetic beam 12 produced by source 13 is introduced into body 11, as shown. The resultant emerging beam 14 is then caused to pass through filter 15, and, upon departing, is detected by apparatus 16. For the SHG case, beam 12 is of a fundamental frequency while departing beam 14 additionally contains a wave of a frequency corresponding with the first harmonic of beam 12. Filter 15 is of such nature as to pass only the wave of concern, in the SHG instance that of the harmonic. Apparatus 16 senses only that portion of the beam leaving filter 15.

The device of FIG. 2 may similarly be regarded as a three-frequency device, with beam 12 containing frequencies to be mixed or consisting of a pump frequency. Under these conditions, exiting beam 14 contains signal and idler frequencies as well as pump, representing three distinct values for nondegenerate operation. For any operation, whether two frequencies or three, efficiency is increased by resonance. Such may be accomplished by coating the surfaces of crystal 11, through which the beam enters and exists. This coating may be partially reflecting only for a generated frequency, as for example 20. Device of claim 12 in which the said body consists essentially of the composition $$Ba_{.4+x}Na_{.8-x}Li_{.4-x}Nb_2O_6$$

where X equals from 0 to .4.

21. Device of claim 12 in which the said body consists essentially of the composition $$Ba_{.6+x}Na_{.6-x}(Ti, Sn)_{.2-x}Nb_2O_6$$

where X equals from 0 to .2.

22. Composition of matter consisting essentially of $$(K_1Na)_{1.2-x}Li_{.8+x}Nb_2O_6$$

where X equals from 0 to .2.

23. Composition of matter consisting essentially of $$Ba_{.4+x}Na_{.8-x}Li_{.4-x}Nb_2O_6$$

where X equals from 0 to .4.

References Cited

Subbarao et al.: "Journal of Chemical Physics," June 1960, pp. 1846–1851.

ROY LAKE, *Primary Examiner.*

DARWIN R. HOSTETTER, *Assistant Examiner.*

U.S. Cl. X.R.

252—62.9; 307—88.3; 321—69; 330—5; 331—94.5; 332—7.51; 350—160